May 31, 1927.  1,630,558

H. N. WYLIE ET AL

JOINT FOR SHEET METAL PLATES

Filed May 20, 1926.

Inventor
Hamilton Neil Wylie
Frederick W. Green
by
Spear, Middleton, Donaldson & Hall
Attys Patented May 31, 1927.

1,630,558

UNITED STATES PATENT OFFICE.

HAMILTON NEIL WYLIE AND FREDERICK MICHAEL GREEN, OF COVENTRY, ENGLAND.

JOINT FOR SHEET-METAL PLATES.

Application filed May 20, 1926, Serial No. 110,506, and in Great Britain May 28, 1925.

This invention relates to joints for sheet metal plates, and its principal object is to provide for the edges of two spaced plates a joint which will be strong, smooth and neat, and particularly suitable in cases where the material may not be welded, brazed or the like, but in which the use of rivets or screws is permissible. Such a joint is of particular service in the construction of air screw blades formed of sheet metal, as well as for the edges of aircraft wings and the like.

Figure 1:
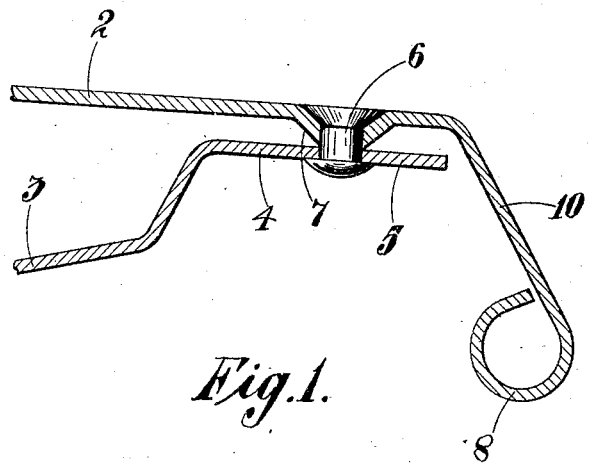
Figure 2:
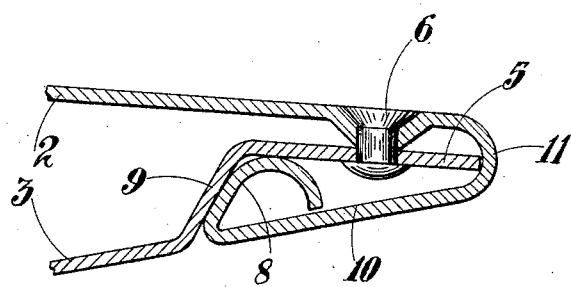

In the accompanying drawings,

Figure 1 is a section showing a joint almost completed,

Figure 2 the joint finished, and

Figure 3:
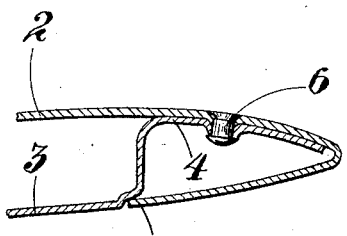

Figure 3 a modification.

Like numerals indicate like parts throughout the drawings.

In the drawings there are shown two converging plates 2 and 3 of which the plate 3 is formed with a step 4 such that the extreme edge 5 is substantially parallel with the plate 2. The angle in the corner of the step may be preferably somewhat greater than a right angle.

The connection of the two plates may be made by screws or rivets, and the head of the screw or the head of the rivet 6 is preferably countersunk, a suitable depression 7 being formed in the plate to receive the head and thus avoid weakening the metal by cutting it away.

The edge of the plate 2 is extended at 10 beyond the edge of the plate 3 and has formed along it a bead 8 preferably of hollow circular section. When this extended edge is bent completely over and subjected to pressure in the process, the hollow bead 8 is adapted to be compressed into the angle of the step, and at the same time to lie closely against the portion 9 of the plate at which the step commences. Thus, this folded over portion is adapted to close completely the recess formed by stepping the plate and to prevent any interruption in the contour of the plate at that position. That is to say, the plate 3 and extension 10, Figure 2, are in line.

Also, in bending the extension over, a neat rounded edge is provided at 11, and it will be readily apparent that a joint of this kind, besides being virtually invisible, will be exceedingly strong and rigid, and that this construction is adapted to impart particular strength to thin plates.

Where the plates are of relatively soft metal, the bead 8 may be omitted and the stepping need be only of such depth as to receive the turned-over portion of the plate. Such a construction is shown in Figure 3 where a shallow step 12 within the deeper step receives the edge of the plate 2 which is then made secure by sweating or the like.

What we claim as our invention and desire to secure by Letters Patent of the United States is:—

1. A joint for sheet metal plates wherein one plate is bent in two positions to form a step, thereby bringing its edge closer to another plate to which it is fastened, and an extension of the second plate is bent to lie over and above the step and to meet the bent edge of the first plate so that it forms a smooth continuation of the latter's surface.

2. A joint as claimed in claim 1 wherein a bead is formed on the edge of the second mentioned plate, which is deformed during the bending to engage and fit into the corner formed by the step in the first plate.

3. A joint for uniting the edges of sheet metal plates wherein a step is formed near the edge of one plate, the second united by rivets or the like to the step, and an extension of the first plate is bent over to meet the step so that it forms a smooth continuation of the latter's raised surface, substantially as and for the purpose described.

4. A joint as claimed in claim 3 for sheet metal plates wherein a bead is formed on the edge of the second mentioned plate, substantially as described.

In testimony whereof we have signed our names to this specification.

HAMILTON NEIL WYLIE.
FREDERICK MICHAEL GREEN.